United States Patent
Major

(10) Patent No.: US 11,974,024 B2
(45) Date of Patent: Apr. 30, 2024

(54) AUTOMATED PROGRAM PROMOTION DETECTION IN A VIDEO STREAMING SYSTEM

(71) Applicant: Sling TV L.L.C., Englewood, CO (US)

(72) Inventor: Robert Drew Major, Orem, UT (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 17/447,138

(22) Filed: Sep. 8, 2021

(65) Prior Publication Data

US 2022/0086532 A1 Mar. 17, 2022

Related U.S. Application Data

(60) Provisional application No. 63/077,165, filed on Sep. 11, 2020.

(51) Int. Cl.
*H04N 21/81* (2011.01)
*H04N 21/258* (2011.01)
*H04N 21/4147* (2011.01)
*H04N 21/44* (2011.01)
*H04N 21/488* (2011.01)
*H04N 21/845* (2011.01)

(52) U.S. Cl.
CPC ..... *H04N 21/812* (2013.01); *H04N 21/25883* (2013.01); *H04N 21/4147* (2013.01); *H04N 21/44008* (2013.01); *H04N 21/4882* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 2004/0226035 | A1* | 11/2004 | Hauser, Jr. | G11B 27/11 386/E5.001 |
| 2004/0237102 | A1* | 11/2004 | Konig | H04N 21/2143 348/E7.054 |
| 2005/0196139 | A1* | 9/2005 | Blackketter | H04N 21/4722 386/296 |
| 2006/0277569 | A1* | 12/2006 | Smith | G11B 27/036 725/35 |
| 2007/0074243 | A1* | 3/2007 | Verhaegh | H04N 21/812 725/35 |
| 2007/0124756 | A1* | 5/2007 | Covell | G06F 16/635 348/E7.071 |

(Continued)

*Primary Examiner* — Alexander Q Huerta
(74) *Attorney, Agent, or Firm* — KW Law, LLP

(57) ABSTRACT

Systems, devices and processes are provided to facilitate video streaming. The various embodiments facilitate the detection of program promotions in a video stream, where program promotions include commercial content that advertises future programs. In general, the embodiments facilitate the detection of program promotions in a video stream through the use of automated process monitors the video stream and determines that a content block is a program promotion when that content block meets a defined set of criteria. This set of criteria can include criteria such as time adjacency, timespan, audio, video and textual factors, and when the content was previously first detected. In such embodiments the ability to detect program promotions using the set of criteria facilitates the replacement of these program promotions with other, potentially more valuable, content.

18 Claims, 3 Drawing Sheets

(56) References Cited

U.S. PATENT DOCUMENTS

| | | | | |
|---|---|---|---|---|
| 2007/0136749 A1* | 6/2007 | Hawkins | ............ | H04N 21/4823 |
| | | | | 725/38 |
| 2008/0255935 A1* | 10/2008 | Madhavan | ......... | G06Q 30/0267 |
| | | | | 707/999.005 |
| 2010/0043022 A1* | 2/2010 | Kaftan | ............. | H04N 21/64784 |
| | | | | 725/34 |
| 2011/0157475 A1* | 6/2011 | Wright | ................... | H04H 20/14 |
| | | | | 348/700 |
| 2014/0013352 A1* | 1/2014 | Shavit | ............. | H04N 21/23418 |
| | | | | 725/34 |
| 2014/0068675 A1* | 3/2014 | Mountain | ............... | H04N 21/47 |
| | | | | 725/43 |
| 2014/0150019 A1* | 5/2014 | Ma | ....................... | H04N 21/458 |
| | | | | 725/34 |
| 2014/0282662 A1* | 9/2014 | Major | ............. | H04N 21/44016 |
| | | | | 725/18 |
| 2014/0282673 A1* | 9/2014 | Neumeier | .......... | H04N 21/8126 |
| | | | | 725/19 |
| 2016/0219322 A1* | 7/2016 | Riedl | ................... | H04N 21/235 |
| 2017/0188115 A1* | 6/2017 | Bafekr | ................. | H04N 21/812 |
| 2019/0082231 A1* | 3/2019 | Chen | ................ | H04N 21/23892 |
| 2019/0191217 A1* | 6/2019 | Kalampoukas | .... | H04N 21/8456 |
| 2021/0133814 A1* | 5/2021 | Thielen | ............ | H04N 21/44008 |

\* cited by examiner

AUTOMATED PROGRAM PROMOTION DETECTION IN A VIDEO STREAMING SYSTEM

PRIORITY CLAIM

This application claims priority to U.S. Provisional Application Ser. No. 63/077,165, filed Sep. 11, 2020, which the contents of which are hereby incorporated by reference.

TECHNICAL FIELD

The following discussion generally relates to video streaming systems. More particularly, the following discussion relates to commercial content detection in video streaming systems.

BACKGROUND

Media content, including video-on-demand (VOD) and television (TV) programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and over-the-top (OTT) TV providers, as well as entities owning or operating streaming video platforms. It is also now commonplace for end users to placeshift media content stored in memory contained in or accessible to a home media receiver, such as an STB located at the end user's residence, over a network for viewing on a smartphone, tablet, or other portable media receiver operated by the end user.

There is a long standing desire to increase the potential revenue generated by such streaming systems. For example, by increasing the value of ads presented to the users of such systems. Thus, there remains a continuing desire to provide systems and methods that improve the delivery of commercial content to the users of such systems. Other desirable features and characteristics will become apparent from the subsequent detailed description and the appended claims, taken in conjunction with the accompanying drawings and this background section.

BRIEF SUMMARY

The various embodiments descried herein provide systems, devices and/or processes to improve the delivery of commercial content in a video streaming system. Specifically, the various embodiments described herein facilitate the detection of program promotions in a video stream, where in general program promotions are commercial content that advertises future programs. In general, the embodiments facilitate the detection of program promotions in a video stream through the use of automated process monitors the video stream and determines that a content block is a program promotion when that content block meets a defined set of criteria. This set of criteria can include criteria such as time adjacency, timespan, audio, video and textual factors, and when the content was previously first detected. In such embodiments the ability to detect program promotions using the set of criteria facilitates the replacement of these program promotions with other, potentially more valuable, content.

In one example embodiment, an automated process is executable by a streaming server in communication with a video player device over a network. In such an embodiment the automated process comprises: streaming a program channel as a video stream from the streaming server to the video player device; monitoring the program channel to identify program promotions in the program channel, where the monitoring identifies a content block as a program promotion when the content block is determined to meet a set of criteria, and where the set of criteria includes: the content block determined to be time adjacent to other commercial content in the program channel; the content block determined to have a timespan less than a threshold length; and responsive to identifying the content block as a program promotion, storing indicia of the content block for future identification of the content block.

In a further embodiment the set of criteria further includes the content block determined to include a text banner identifying a future program. In a further embodiment the set of criteria further includes: the content block determined to include audio or video identifying a future program. In a further embodiment the set of criteria further includes the content block determined to include content first detected within a preceding time period less than a threshold time period. In a further embodiment the set of criteria further includes the content block determined to occur in a timeslot in the program channel identified as previously containing a program promotion.

In a further embodiment the automated process further includes monitoring the program channel to identify future occurrences of the content block in the video stream using the stored indicia of the program promotion. In a further embodiment the automated process further includes replacing at least one identified future occurrence of the content block in the video stream with replacement commercial content.

In a further embodiment the replacement commercial content is selected based at least in part on demographics of a user. In a further embodiment the replacement commercial content is selected based at least in part on a time and date of the streaming of the program channel to the video player device. In a further embodiment the program promotion comprises an advertisement for a future program on the program channel. In a further embodiment the streaming the program channel comprises streaming from a digital video recorder (DVR) that includes a recording of the program channel. In a further embodiment the streaming the program channel comprises streaming the program channel as linear programming as received from a content source. In a further embodiment the streaming the program channel comprises streaming the program channel as time shifted programming.

In another embodiment, an automated process executable by a streaming server in communication with a video player device over a network is provided. In such an embodiment the automated process comprises: streaming a program channel as a video stream from the streaming server to the video player device; monitoring the program channel to identify program promotions in the program channel, where the program promotions advertise future programs, where the monitoring identifies a content block as a program promotion when the content block is determined to meet a set of criteria, and where the set of criteria includes: the content block determined to be time adjacent to previously identified commercial content in the program channel; the content block determined to have a timespan less than a threshold length; and the content block determine to include a text banner identifying a future program; responsive to identifying the content block as a program promotion, storing indicia of the content block for future identification of the program promotion; monitoring the program channel to identify future occurrences of the content block in the program channel using the stored indicia of the content block; and replacing at least one identified future occurrence of the content block in the video stream with replacement commercial content.

In another embodiment, a streaming server in communication with a video player device over a network is provided. In this embodiment the streaming server comprises a processor and a memory, wherein the processor is configured to perform an automated process by executing digital instructions stored in the memory. In this embodiment the automated process comprises: streaming a program channel as a video stream from the streaming server to the video player device; monitoring the program channel to identify program promotions in the program channel, where the monitoring identifies a content block as a program promotion when the content block is determined to meet a set of criteria, and where the set of criteria includes: the content block determined to be time adjacent to other commercial content in the program channel; the content block determined to have a timespan less than a threshold length; and responsive to identifying the content block as a program promotion, storing indicia of the content block for future identification of the content block.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

Figure 1:
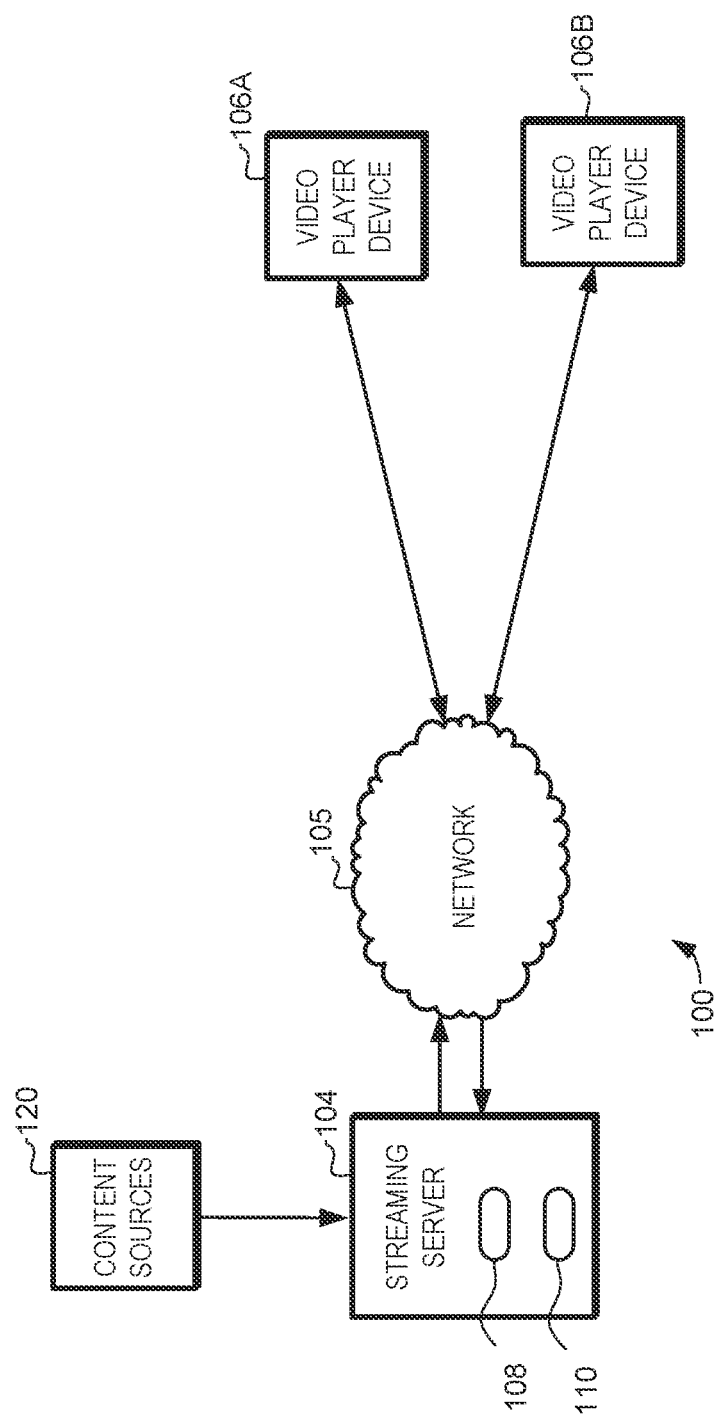
FIG. 1 is a diagram of an example video streaming system that includes a plurality of video player devices.

The following detailed description of the invention is intended to provide various examples, but it is not intended to limit the invention or the application and uses of the invention. Furthermore, there is no intention to be bound by any theory presented in the preceding background or the following detailed description.

The various embodiments descried herein provide systems, devices and/or processes to improve the delivery of commercial content in a video streaming system. Specifically, these embodiments facilitate the detection of program promotions in video streams. In general, program promotions are commercials or other commercial content that advertises future programs. The embodiments described herein facilitate the detection of such program promotions in a video stream through the use of automated process that monitors the video stream for content blocks that meet a defined set of criteria. This set of criteria can include criteria such as time adjacency, timespan length, audio, video and textual factors, and the time since the content in the content block was first detected, to give several non-limiting examples.

In these embodiments the ability to detect program promotions in a video stream using the set of criteria can be used facilitate the automatic replacement of the program promotions with other content. For example, a program promotion can be detected and replaced with paid commercial content. Such an embodiment can significantly increase the revenue generated, particularly in cases where the program promotion does not itself directly generate revenue. In other embodiments, the ability to detect program promotions can be used to facilitate the time shifting or skipping of such commercial content in a way that provides an improved user experience.

In one example embodiment, an automated process is executable by a streaming server in communication with a video player device over a network. In such an embodiment the automated process comprises: streaming a program channel as a video stream from the streaming server to the video player device; monitoring the program channel to identify program promotions in the program channel, where the monitoring identifies a content block as a program promotion when the content block is determined to meet a set of criteria, and where the set of criteria includes: the content block determined to be time adjacent to other commercial content in the program channel; the content block determined to have a timespan less than a threshold length; and responsive to identifying the content block as a program promotion, storing indicia of the content block for future identification of the content block.

This automated process is particularly applicable to facilitating the replacement of program promotions with more valuable commercial content. As noted above, program promotions are in general commercials for future programs, including programs that will be aired (e.g., broadcast, transmitted, streamed) in the near or immediate future. In many cases program promotions result in no direct revenue for the program channel provider. Instead, these program promotions serve only to increase viewership of the future program that is advertised is the program promotion. As such, these program promotions have limited value initially, and can have even less value when streamed after the future program content being advertised has already been aired (e.g., when the program promotions are streamed from a digital video recording of the original stream after the advertised program has already aired). Thus, replacing such program promotions with other commercial content, including paid commercial, can have significant economic value.

The general concepts described herein may be implemented in any video streaming context, but are especially relevant to the streaming of television programming that commonly includes commercials amid live or pre-recorded programming. Of course, equivalent embodiments could be implemented within other contexts, settings or applications as desired.

Turning now to the drawings and with initial reference to FIG. 1, a video streaming system 100 suitably includes a streaming server 104 and a plurality of video player devices 106A-b. In general, the streaming server 104 receives video content from one or more content sources 120, and transmits that video content through the network 105 to the video player devices 106A-b in the form of a video stream that can be received, processed, and displayed at the video player devices 106A-b.

In general, the content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-B. For example, the streaming server 104 can transmit an encoded video stream via a content delivery network (CDN) for distribution on network 105 (e.g., the Internet) as part of an RSDVR, VOD or other video streaming service. The video streams are thus transmitted to the video player devices 106A-b.

In general, each of the video player devices 106A-B includes a combination of hardware and/or software needed to receive, process, and play the video streams received from the streaming server 104. As examples, each of the video player devices 106A-B can be implemented to include a streaming application stored in memory and being executed by a suitable processor. As some specific examples, each of the video player devices 106A-B can be implemented with any suitable computing device, including laptops, tablets, virtual reality (VR) devices, and mobile communication devices (e.g., smart phones). Such devices may include an integrated display screen, or may be coupled to a separate display screen.

In one example embodiment, the video streaming system 100 is implemented to perform one or more automated processes during the streaming of video content from the streaming server 104 to the plurality of video player devices 106A-B. In general, these automated processes provide for the improved delivery of commercial content in the video streaming system 100 by facilitating the detection of program promotions in video streams. Specifically, the video streaming system 100 facilitates the detection of program promotions in a video stream through the use of automated process that monitors the video stream for content blocks that meet a defined set of criteria 108. This set of criteria 108 can include time adjacency, timespan length, audio, video and textual factors, and the time since the content in the content block was first detected, to give several non-limiting examples.

In these embodiments the ability of the video streaming system 100 to detect program promotions in a video stream using the set of criteria 108 can be used facilitate the automatic replacement of the program promotions with other content. For example, a program promotion can be detected and replaced with other commercial content 110. Such an embodiment can significantly increase the revenue generated by the streaming video system 100, particularly in cases where the program promotion does not itself directly generate revenue for the streaming video system 100 or the content sources 120. In other embodiments, the ability to detect program promotions can be used to facilitate the time shifting or skipping of such commercial content in a way that provides an improved user experience.

In one example embodiment, an automated process is executable by a video streaming system 100 that comprises: streaming a program channel as a video stream from the streaming server 104 to the video player device 106A-B; monitoring the program channel to identify program promotions in the program channel, where the monitoring identifies a content block as a program promotion when the content block is determined to meet a set of criteria 108, and where the set of criteria 108 includes: the content block determined to be time adjacent to other commercial content in the program channel; the content block determined to have a timespan less than a threshold length; and responsive to identifying the content block as a program promotion, storing indicia of the content block for future identification of the content block.

In another embodiment, the set of criteria further includes the content block determined to include a text banner identifying a future program. In another embodiment, the set of criteria further includes the content block determine to include audio or video identifying a future program. In another embodiment, the set of criteria further includes the content block determined to include content first detected within a preceding time period less than a threshold time period. In another embodiment, the set of criteria further includes the content block determined to occur in a timeslot in the program channel identified as previously containing a program promotion.

In another embodiment, the automated process further comprises monitoring the program channel to identify future occurrences of the content block in the video stream using the stored indicia of the program promotion.

In another embodiment, the automated process further comprises replacing at least one identified future occurrence of the content block in the video stream with replacement commercial content. In such an embodiment the replacement commercial content can be selected based at least in part on demographics of a user of the video player device 106A-B. For example, the replacement commercial content can be selected based at least in part on a time and date of the streaming of the program channel to the video player device. As another example, the replacement commercial content can be selected based on age, gender, familial status, employment, and location of the user to the extent that such details are known. In other embodiments the commercial content can be selected based on previously determined program viewing habits of the user. Other factors such as internet history and shopping history can also be used when known. Additionally, the specific time and date of the streaming of the program channel can be used to select the advertisements.

In another embodiment, the streaming the program channel comprises streaming from a digital video recorder (DVR) that includes a digital recording of the program channel. For example, the streaming of the program channel 114 can comprise streaming from an RSDVR that operates with the streaming server 104 and has previously recorded the content of the program channel for later streaming to the video player devices 106A-B. In another embodiment, the streaming the program channel comprises streaming the program channel as time shifted programming.

In another embodiment, the streaming the program channel comprises streaming the program channel as linear programming as received from a content source, where "linear programming" is defined as content that is received from the content sources 120 and then immediately streamed to the video player devices 106A-B with only relatively small delays for processing. As such, linear programming can include broadcast television channel or cable television channel that is received and streamed by the streaming server 104. As such, linear programming can include live programming such as sports or other live events that are recorded and streamed from the streaming server 104 with only minimal delays between the recording of the event and the streaming of the event as linear programming. In some embodiments this linear programming can be provided with the ability to "lookback" for a predetermined amount of time.

These various embodiments of automated processes executed by the video streaming system 100 are particularly applicable to facilitating the replacement of program promotions with other, more valuable, commercial content 110, including commercial content for which the content provider is paid a fee. As noted above, in many cases program promotions result in no direct revenue for the program channel provider (e.g., one of the content sources 120). Furthermore, the limited value of program promotions decreases even further after the future program content being advertised has been aired. For example, when the program promotions are streamed from a digital video recording or other time shifted content source after the airing of the advertised future content. Thus, detecting and replacing program promotions with paid commercial content can provide a significant increase in revenue.

Figure 2:
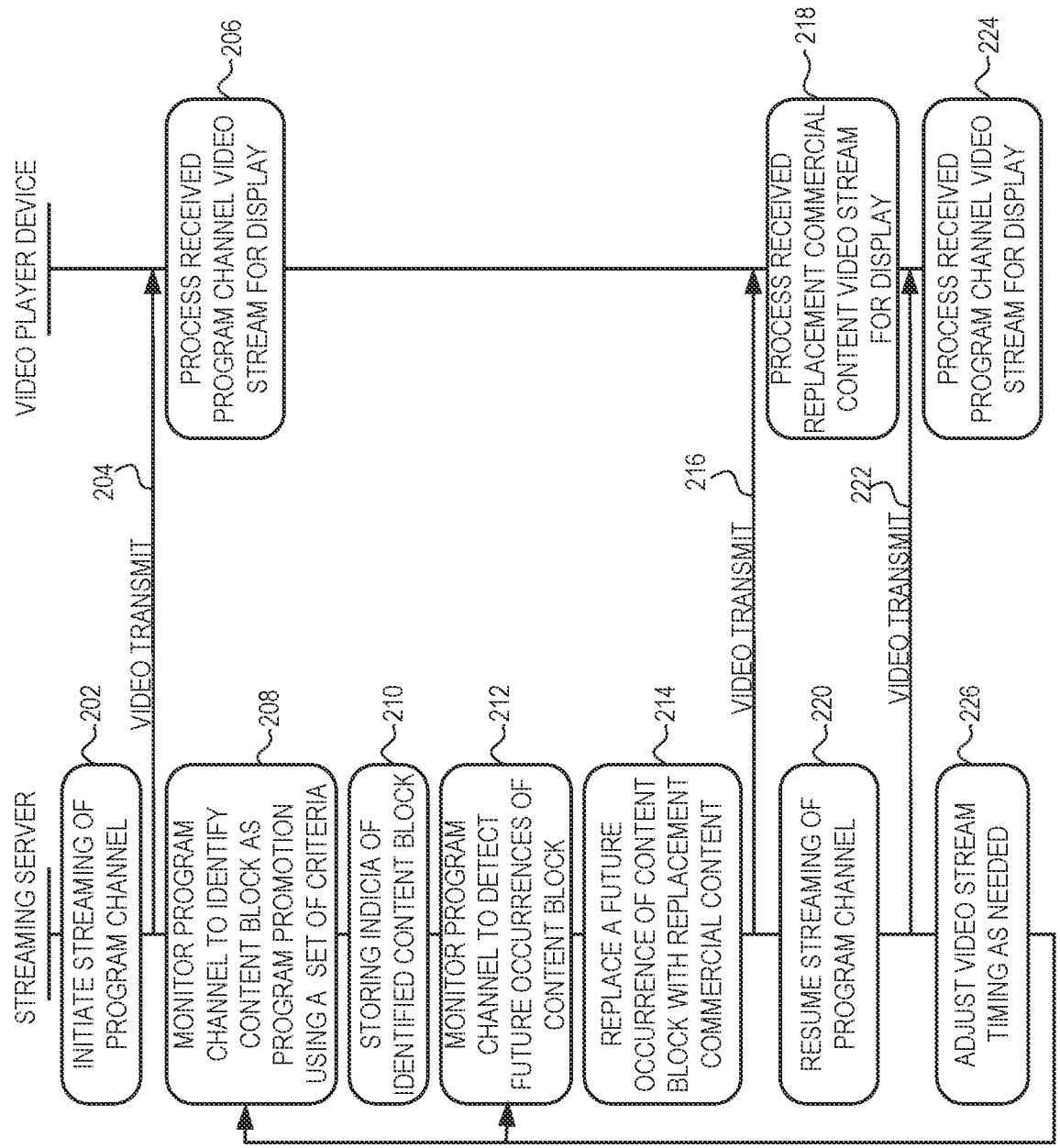
FIG. 2 is a flowchart showing various processes executable by various devices in a streaming media system.

Turning now to FIG. 2, a process flow diagram 200 illustrates various example processes and data flows that can be automatically executed by a streaming server (e.g., streaming server 104) in a video streaming system (e.g., video streaming system 100) that includes one or more video player devices (e.g., video player devices 106A-B). Specifically, the process flow diagram 200 illustrates a process flow between an exemplary streaming server and an exemplary video player device that provides for the automatic detection and replacement of program promotions with other replacement commercial content.

To facilitate the process flow, communications between the various devices can be initiated and established in any suitable manner. For example, communication between the various devices and networks may be established using Internet or other protocols that can include both wireless networking systems (e.g., Wi-Fi) or wired networking systems (e.g., Ethernet or HDMI).

At process step 202 the streaming server initiates a streaming video session and begins transmitting a video stream of a program channel to the video player device using video transmit function 204. In a typical embodiment the streaming server initiates the streaming video session at the direction of the video player device. For example, a streaming application on the video player device can communicate with the streaming server and provide a user interface for initiating a streaming video session of the program channel. Process step 202 and video transmit function 204 can include the encoding and transmitting of the selected program channel from any suitable content source. Additionally, such processing and transmitting can include transmitting using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the video player devices as input video streams.

At process step 206, the video player device processes the received input video streams of the program channel for display on the video player device. In this process step a streaming application and/or operating system and/or specialized hardware on the video player device performs typical video processing tasks associated with the receiving and displaying of video. For example, these elements can perform various decoding and rendering functions as needed to display the program channel on a video display device.

At process step 208, the streaming server monitors the program channel to identify content blocks as program promotions using a set of criteria (e.g., criteria 108). Specifically, in step 208 content blocks in the video stream are identified as program promotions when the content block is determined to meet a defined set of criteria. As will be described in greater detail below, this set of criteria can include one or more criteria relating to time adjacency, timespan length, audio, video and textual factors, and the time since the content in the content block was first detected, to give several non-limiting examples.

As one specific example, step 208 can identify a content block as a program promotion when the content block is determined to be time adjacent to other commercial content in the program channel and the content block is determined to have a timespan less than a threshold length. A content block that is both time adjacent to other commercial content and has a timespan less than a threshold length is likely to be a program promotion because program promotions are typically shorter than regular commercials and are commonly interspersed between or otherwise adjacent to other commercials.

To implement step 208 the start time and stop time of the content block to be analyzed in this step would be detected. Any suitable technique can be used to detect the start and stop of a content block to be analyzed. In one specific embodiment, the program channel is analyzed to recognize scene changes in the underlying content. For example, these scene changes can be recognized based upon a digital analysis of the audio and/or video in the program channel.

The determined start and stop of the content block can then be used to determine both the timespan of the content block and whether the content block is adjacent other commercial content in the program channel. When determining adjacency to other commercial content any suitable technique can be used to identify the other commercial content.

To facilitate the detection of program promotions using this technique the threshold length is generally set to a value that is less than the length of typical regular commercial and longer than the typical program promotion. For example, where regular commercials are typically 30 seconds or longer and program promotions are typically significantly less than 30 seconds long the threshold length could be set to 15 or 10 seconds.

In some implementations the threshold length could be set to different values for different content sources. For example, different threshold lengths could be used for different program channels where the different program channels commonly have different types of commercial content. In other implementations the threshold length could be set to different values for different users, different geographic areas or jurisdictions. However, in each of these cases the threshold length would typically still be based at least in part on the typical length of commercials and program promotions.

Timespan length and time adjacency are just two examples of criteria that can be used to determine if a content block is a program promotion in step 208. For example, the set of criteria could also include that the content block is determined to include a text banner identifying a future program. In this case an analysis would be performed to locate text in the video stream and the textual analysis performed on the text to determine if it is indicative of a program promotion. For example, by identifying text naming a known program (e.g., "local news"), text identifying an upcoming time (e.g., 10:00 PM), or text including common identifying phrases such as "coming soon", "tonight" or "up next". In each case the identified text serves as another indication that the content block is a program promotion.

As another example, the set of criteria could also include that the content block is determined to include audio or video identifying a future program. In this case a video and/or audio analysis would be performed to identify specific instances of video and audio that are indicative of a program promotion. For example, by identifying video or audio associated with known past promotions.

As another example, the set of criteria could also include that the content block is determined to include content first detected within a preceding time period less than a threshold time period. In this case the criterion is used to improve the likelihood of a correct determination by identifying content as being relatively new or fresh. For example, by setting the threshold time period to such a relatively recent value (e.g., 12, 24, 48, 72 hours to give non-limiting examples) such new or fresh content can be identified. Because program promotions are advertising upcoming programs they are generally only run for a relatively short period of time before the advertised program is aired. Thus, if a content block contains content that is has been aired at a much earlier date (e.g., more than several days before) that content block is much less likely to contain a program promotion.

As another example, the set of criteria could also include that the content block is determined to occur in a timeslot in the program channel identified as previously containing a program promotion. This criterion can be used for cases where it is determined that program promotions are frequently aired in the same timeslot. For example, in some applications it may be determined that during a particular program that the next to last advertising timeslot frequently contains program promotions. Thus, in this case the criterion can be used to further improve the likelihood of a correct determination by focusing on commonly used timeslots.

In all of these embodiments the process step 208 monitors the program channel to identify content blocks as program promotions using a set of criteria, where the set can include various combinations of criteria. With a program promotion identified in step 208, the next step 210 is to store indicia of the identified content block. This step facilitates the later identification of new airings of the program promotion in the content block. In one embodiment, step 210 can be performed by creating a new entry in the database of commercial content. For example, for each new entry a digital "signature" or "fingerprint" of the program promotion can be stored for subsequent analysis.

At process step 212 the program channel is monitored to detect future occurrences of the content block containing the program promotion. This step can be implemented and performed in several different ways. In general, the monitoring of the program channel can be performed by comparing content in the program channel to previously stored indicia of the content block and the contained program promotions. Again, such indicia can be stored in a database on the streaming server (e.g., streaming server 104) or on separate computing devices. In such an example the audio and/or video content in the program channel can be analyzed to compare the content block to previously identified indicia in the database.

As one specific example, the program channel content can be analyzed to recognize scene changes in the program content. When a scene change is identified a digital analysis of the audio and/or video in the new scene is performed to compare the new scene to previously recognized scene's that are stored in the database. If the new scene is found in the database it can be identified as a program promotion.

In process step 212 such a comparison of program content to stored indicia of program promotion content can be performed in real-time as content is received and processed by the streaming server. This allows the comparison to be performed and commercial content identified before the content is streamed to the video player device.

At process step 214 the detected occurrence of the content block containing the program promotion is replaced with replacement commercial content, and a video stream of the replacement commercial content is transmitted to the video player device using video transmit function 216. Again, process step 214 and video transmit function 216 can include the encoding and transmitting of the selected program channel using any suitable technique or protocol. As was described above, this replacement of program promotions with other, potentially more valuable, commercial content can result in significantly increased revenue. This is particularly true when the program promotion being replaced was for future program content that had already been aired. For example, when the program channel is being streamed from an RSDVR or other time shifted content source after the airing of the advertised future content. Thus, detecting and replacing program promotions with paid commercial content can provide a significant increase in revenue.

And in one embodiment this replacement commercial content is targeted for a user of the video player device. In such an embodiment the replacement commercial content can be selected based at least in part on the demographics of the user of the video player device. For example, the replacement commercial content can be selected based on age, gender, familial status, employment, and location of the user to the extent that such details are known. In other embodiments the replacement commercial content can be selected based on previously determined program viewing habits of the user. Other factors such as purchase history, internet history and location history can also be used when known. Additionally, the specific time and date of the streaming of the program channel can be used to select the replacement commercial content.

In some embodiments, process step 214 is implemented to replace a program promotion only after it has been viewed by a user. For example, this step can be implemented to replace program promotions only after they have been viewed by a user for a predetermined number of times. Again, after a program promotion has been viewed by a user for a number of times it can have very limited value to the program channel provider, and thus the replacement of such commercials can have significant benefit. In such an embodiment the process step 214 would involve the tracking the viewing of program promotions or other commercial content by the user.

It should be noted that the process step 214 does not require that the replacement commercial content be inserted into the video stream with the same starting time as the detected commercial content it is replacing. Instead, in some embodiments the detected commercial content is skipped and the replacement commercial content is inserted into the video stream at a later time. For example, the replacement commercial content can be inserted at the end of a current ad block or other desirable location in the video stream. In other embodiments the replacement commercial content is inserted into the video stream before detected commercial content. Such an embodiment can be desirable when the timing of the detected commercial content is known or can be predicted.

At process step 218, the video player device processes the received input video stream of the replacement commercial content for display on the video player device. Again, in this process step a streaming application and/or operating system and/or specialized hardware on the video player device performs typical video processing tasks associated with the receiving and displaying of video.

At process step 220 the streaming server resumes streaming the program channel and resumes transmitting a video stream of a program channel to the video player device using video transmit function 222. Again, process step 220 and video transmit function 222 can include the encoding and transmitting of the selected program channel using any suitable technique or protocol. At process step 224, the video player device processes the received input video stream of the program channel for display on the video player device.

At process step 226 the timing of the video stream is adjusted as needed. In some cases program promotion can be replaced with other commercial content having a different timespan. Thus, the new commercial content can be longer or shorter in length. In some cases then it will be desirable to adjust the timing of the video stream to at least partially compensate for these differences.

For example, if the content block was a 15 second program promotion, and the replacement commercial content was a standard 30 second commercial, the program channel stream can now be delayed by ~15 additional seconds. This introduced additional delay relative to the content source can be undesirable in many circumstances. For example, it is generally desirable to minimize any delays when streaming live programming. To compensate for this introduced delay, step 226 can adjust the timing of the video stream to compensate for the difference in the timespan of the original program promotion.

As one example, the process step 226 can adjust the timing of the video streaming by skipping all or part of other identified commercial content. Skipping all or part of the identified additional commercial content at least partially compensates for the for the difference in the timespan of the original commercial content and the timespan of the replacement commercial content. Stated another way, skipping the later detected commercial content can be used to reduce any delay in the video stream introduced in process step 214.

Taken together these actions effectively result in two pieces of commercial content being replaced with a single longer piece of commercial content, and notably can be performed even when the two shorter pieces of commercial content are not adjacent in time in the video stream.

The process flow can then return to process step 208 to again identify content blocks as containing program promotions as desired. Additionally, the process flow can return to step 212 to monitor for future occurrences of the previously identified content block. Thus, the process flow illustrated in FIG. 2 can facilitate the detection and replacement of program promotions with more valuable commercial content.

Figure 3:
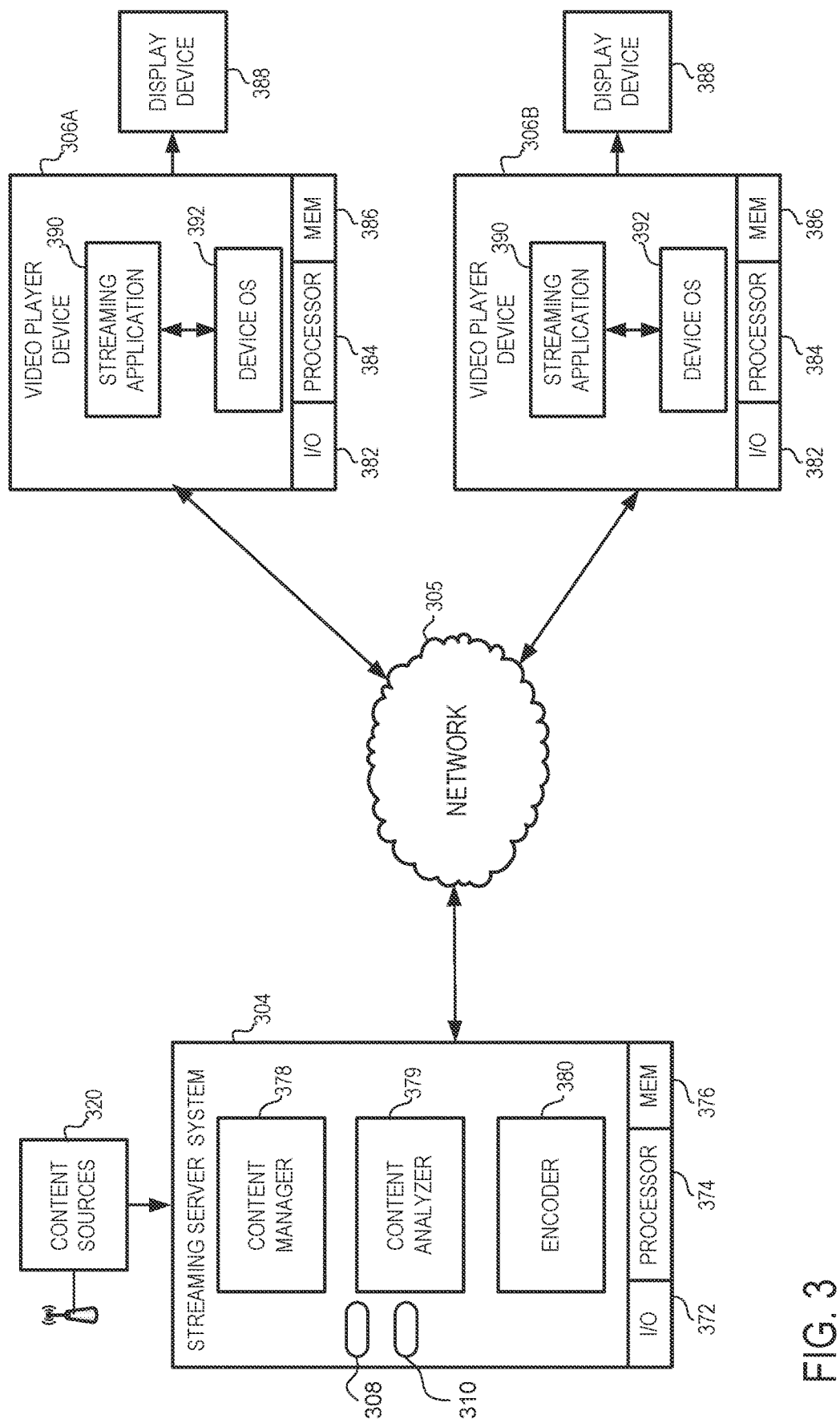
FIG. 3 is a detailed diagram of one example implementation of a streaming media system.

Turning now to FIG. 3 a video streaming system 300 suitably includes a streaming server system 304 and a plurality of video player devices 306A-B. In general, the streaming server system 304 receives video content from one or more content sources 320, and transmits that video content through the network 305 to the video player devices 306A-B in the form of a video stream that can be received, processed, and displayed at the video player devices 306A-B. The video streaming system 300 is an example of the type of system that can be used to facilitate the detection and replacement of program promotions. For example, the video streaming system 300 can be used to implement the process flow illustrated in the process flow diagram 200 of FIG. 2.

In general, the content sources 320 can be any type of video content source, including media providers, content aggregators or distributors such as a cable television system operator, a direct broadcast satellite (DBS) system operator, or simply a network service provider or the like. In accordance with the embodiments described herein the content sources include at least one set of criteria 308 and at least one replacement commercial content 310. The streaming server system 304 processes the received content into a suitable format streaming to the video player devices 306A-B. To facilitate this, the streaming server system 304 includes at least an I/O 372, a processor 374, and a memory 376. Additionally, the streaming server system 304 includes a content manager 378, a content analyzer 379, and an encoder 380.

In general, each of the video player devices 306A-B includes a combination of hardware and/or software needed to receive, process, and play the video streams received from the streaming server system 304. For example, each of the video player devices includes an I/O 382, a processor 384, a memory 386, and a display device 388. Furthermore, each of the video player devices 306A-B includes a streaming application 390 and a device OS 392 residing in memory 386 and being executed by the processor 384. As some specific examples, each of the video player devices 306A-B can be implemented with any suitable computing device, including laptops, tablets and mobile communication devices (e.g., smart phones). Such devices may include an integrated display device 388, or may be coupled to a separate display device 388.

The content sources 320 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals for one or more networks, channels or the like are received in any format by the system operator via satellite, fiber optic or any other conventional wireless or physical media for transmitting television signals. The signals are received, demodulated and decoded as needed by any appropriate receiver(s) to extract program signals that represent the decoded television program stream. Alternately or additionally, content sources 320 may receive content directly from a broadcaster, distributor or other source, as desired.

In a typical embodiment the received programming signals are analyzed as appropriate to identify the program contents. For example, the content analyzer 379 can be implemented to analyze audio and/or video content in the programming signals. Such a system can be used to recognize advertisements (e.g., commercials) or other portions of the underlying content. As described above, such a system can be used to identify program promotions and other relatively short commercial content to facilitate the replacement of such commercial content.

In a typical embodiment, the content analyzer 379 executes a software application that performs the analysis based upon the audio and/or video content received. In various embodiments, content analyzer 379 may consider average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Many different audio and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software, or the database may be a custom database developed to store content recognition data, as desired. Such a database may reside on the same computing hardware as the streaming server system 304, or separate computing resources could be provided, including any sort of cloud-based computing resources.

In one specific embodiment, the content analyzer 379 is configured to recognize scene changes in the underlying content. When a different scene is identified in the content analyzer 379 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content analyzer 379 is therefore able to identify advertisements or other contents of the received television broadcasts and other video though analysis of the underlying audio or video content.

In many implementations, content identification is performed by the content analyzer 379 in parallel for multiple channels that may be simultaneously received for content aggregation, for collection of advertising data, or for any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments the content analyzer 379 can perform content analysis in parallel with the encoding provided by the encoder 380. The encoder 380 can encode live broadcast signals and other such video content for adaptive streaming on the network 305 and/or for broadcast via cable, direct broadcast satellite, terrestrial broadcast, and/or the like. Encoder 38o, for example, can be used to encode signals into a suitable format for broadcast via cable, DBS, or the like. Such broadcasts may be ultimately received by video player devices 306A-B via the network 305 or the like. In one specific example, the encoder 380 suitably encodes programs contained within signals from the content sources 320 into one or more adaptive streams that each representing a media program in its entirety, but with different bit rates, frame rates, resolution and/or other levels of quality. Typically, each stream is made up of smaller segments that each represent a small portion of the program content with a single data file. Each stream is typically encoded so that segments of the different streams are interchangeable with each other, often using a common timing index. This allows a client video player devices 306A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 305 and can be served by conventional CDN or other web-type servers, thereby providing a convenient mechanism for distributing adaptive media streams to a variety of different client devices on network 305.

Again, other embodiments may use different encoders for the encoder 380. Still other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Content manager 378 is provided to manage and distribute electronic program guide (EPG) data and other information about the programs that are distributed within streaming server system 304. The content manager 378 may also be implemented to process information relating to advertisements or other portions of the content stream, to associate actions to be performed by the viewer and/or the playback device based upon the content of the stream, and/or for any other purpose.

The data maintained by the content manager 378 could include channel information and timing information about each entry so that the particular content can be readily identified. Other embodiments may use different identification data, such as distributor or network information, or any other information as desired. Some implementations may incorporate conventional EPG data (e.g., data obtained from a vendor or other source), while other implementations may use channel and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 306A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

In accordance with the embodiments described herein the video streaming system 300 is implemented to perform one or more automated processes during the streaming of video content from the streaming server system 304 to the plurality of video player devices 306A-B. In general, these automated processes provide for the improved delivery of commercial content in the video streaming server system 304 by facilitating the detection of program promotions in video streams. Specifically, the video streaming system 300 facilitates the detection of program promotions in a video stream through the use of automated process that monitors the video stream for content blocks that meet the defined set of criteria 308. This set of criteria 308 again can include time adjacency, timespan length, audio, video and textual factors, and the time since the content in the content block was first detected, to give several non-limiting examples. In these embodiments the ability of the video streaming system 300 to detect program promotions in a video stream using the set of criteria 308 can be used facilitate the automatic replacement of the program promotions with other content. For example, a program promotion can be detected and replaced with other replacement commercial content 310. Such an embodiment can significantly increase the revenue generated by the streaming video system 300, particularly in cases where the program promotion does not itself directly generate revenue for the streaming video system 300 or the content sources 320. In other embodiments, the ability to detect program promotions can be used to facilitate the time shifting or skipping of such commercial content in a way that provides an improved user experience.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a streaming server in communication with a video player device over a network, the automated process comprising:
    streaming a program channel as a video stream from the streaming server to the video player device;
    monitoring, by the streaming server, the program channel to identify program promotions in the program channel, wherein the streaming server identifies a content block as a program promotion advertising a future program by:
        determining, by the streaming server, the content block is time adjacent to other commercial content in the program channel,
        determining, by the streaming server, the content block includes a text banner referencing the future program, and
        determining, by the streaming server, the content block has a timespan less than a threshold length;
    storing, by the streaming server, a fingerprint of the content block for future identification in response to identifying the content block as the program promotion, wherein the fingerprint comprises prominent tones across a set of frequency bands in an audio portion of the video stream;
    replacing the program promotion in a second video stream with replacement content in response to identifying the program promotion in the second video stream by detecting the prominent tones across the set of frequency bands of the fingerprint, wherein the replacement content is selected in response to data associated with a second video player device receiving the second video stream; and
    adjusting the timing of the second video stream in response to the replacement content having a different duration than the program promotion.

2. The automated process of claim 1, wherein the streaming server further identifies the content block as the program promotion advertising the future program by determining the content block includes audio or video identifying the future program.

3. The automated process of claim 1, wherein the streaming server further identifies the content block as the program promotion advertising the future program by determining the content block includes content first detected within a preceding time period less than a threshold time period.

4. The automated process of claim 1, wherein the streaming server further identifies the content block as the program promotion advertising the future program by determining the content block occurs in a timeslot in the program channel identified as previously containing a program promotion.

5. The automated process of claim 1 further comprising:
    monitoring the program channel to identify future occurrences of the content block in the video stream using the stored fingerprint of the program promotion.

6. The automated process of claim 5 further comprising:
    replacing at least one identified future occurrence of the content block in the video stream with replacement commercial content.

7. The automated process of claim 6 wherein the replacement commercial content is selected based at least in part on demographics of a user.

8. The automated process of claim 6 wherein the replacement commercial content is selected based at least in part on a time and date of the streaming of the program channel to the video player device.

9. The automated process of claim 1 wherein the program promotion comprises an advertisement for the future program on the program channel.

10. The automated process of claim 1 wherein the streaming the program channel comprises streaming from a digital video recorder (DVR) that includes a recording of the program channel.

11. The automated process of claim 1 wherein the streaming the program channel comprises streaming the program channel as linear programming as received from a content source.

12. The automated process of claim 1 wherein the streaming the program channel comprises streaming the program channel as time shifted programming.

13. An automated process executable by a streaming server in communication with a video player device over a network, the automated process comprising:
- streaming a program channel as a video stream from the streaming server to the video player device;
- monitoring, by the streaming server, the program channel to identify program promotions in the program channel, where the streaming server identifies a content block as a program promotion advertising a program by:
  - determining, by the streaming server, the content block is time adjacent to previously identified commercial content in the program channel,
  - determining, by the streaming server, the content block has a timespan less than a threshold length, and
  - determining, by the streaming server, the content block includes a text banner identifying a program;
- responsive to identifying the content block as a program promotion, storing a fingerprint of the content block for future identification, wherein the fingerprint comprises prominent tones across a set of frequency bands in an audio portion of the video stream;
- monitoring the program channel to identify a second occurrence of the content block by detecting the prominent tones across the set of frequency bands from the fingerprint;
- replacing the second occurrence of the content block in a second video stream to a second video player device with replacement content in response to identifying the second occurrence and in response to the program having aired, wherein the replacement content is selected based on data associated with a second video player device receiving the second video stream; and
- adjusting the timing of the second video stream in response to the replacement content having a different duration than the second occurrence of the content block.

14. A streaming server in communication with a video player device over a network, the streaming server comprising a processor and a memory, wherein the processor is configured to perform an automated process by executing digital instructions stored in the memory, wherein the automated process comprises:
- streaming a program channel as a video stream from the streaming server to the video player device;
- monitoring, by the streaming server, the program channel to identify program promotions in the program channel, wherein the streaming server identifies a content block as a program promotion that advertises a program by:
  - determining, by the streaming server, the content block is time adjacent to other commercial content in the program channel,
  - determining, by the streaming server, the content block includes a text banner referencing the program, and
  - determining, by the streaming server, the content block has a timespan less than a threshold length;
- responsive to identifying the content block as the program promotion, storing a fingerprint of the content block for future identification, wherein the fingerprint comprises prominent tones across a set of frequency bands in an audio portion of the video stream;
- replacing the program promotion in a second video stream with replacement content in response to identifying the program promotion in the second video stream by detecting prominent tones across the set of frequency bands from the fingerprint of the content block, wherein the replacement content is selected in response to data associated with a second video player device receiving the second video stream; and
- adjusting the timing of the second video stream in response to the replacement content having a different duration than the program promotion.

15. The streaming server of claim 14, wherein the streaming server further identifies the content block as the program promotion by determining the content block determined to include audio or video identifying a future program.

16. The streaming server of claim 14, wherein the streaming server further identifies the content block as the program promotion by determining the content block includes content first detected within a preceding time period less than a threshold time period.

17. The streaming server of claim 14, wherein the streaming server further identifies the content block as the program promotion by determining the content block occurs in a timeslot in the program channel identified as previously containing a program promotion.

18. The streaming server of claim 14 wherein the automated process further comprises:
- monitoring the program channel to identify future occurrences of the content block in the video stream using the stored fingerprint of the program promotion; and
- replacing at least one identified future occurrence of the content block in the video stream with replacement commercial content.

* * * * *